(12) United States Patent
King

(10) Patent No.: US 10,422,232 B2
(45) Date of Patent: Sep. 24, 2019

(54) COMPONENT FOR A GAS TURBINE ENGINE

(71) Applicant: United Technologies Corporation, Farmington, CT (US)

(72) Inventor: Christopher King, Bristol, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 200 days.

(21) Appl. No.: 15/601,007

(22) Filed: May 22, 2017

(65) Prior Publication Data

US 2018/0334908 A1 Nov. 22, 2018

(51) Int. Cl.

| F01D 5/18 | (2006.01) |
|---|---|
| F01D 9/02 | (2006.01) |
| F23R 3/00 | (2006.01) |
| F01D 25/12 | (2006.01) |
| F04D 29/32 | (2006.01) |
| F04D 29/54 | (2006.01) |
| F04D 29/58 | (2006.01) |
| F01D 11/08 | (2006.01) |

(52) U.S. Cl.
CPC ............. *F01D 5/186* (2013.01); *F01D 5/187* (2013.01); *F01D 9/02* (2013.01); *F01D 11/08* (2013.01); *F01D 25/12* (2013.01); *F04D 29/324* (2013.01); *F04D 29/542* (2013.01); *F04D 29/582* (2013.01); *F23R 3/002* (2013.01); *F05D 2220/32* (2013.01); *F05D 2230/211* (2013.01); *F05D 2260/202* (2013.01); *F05D 2260/204* (2013.01)

(58) Field of Classification Search
CPC .......... F01D 5/186; F01D 5/187; F01D 11/08; F01D 9/02; F01D 25/12; F04D 29/542; F04D 29/582; F04D 29/324; F23R 3/002; F05D 2260/204; F05D 2230/211; F05D 2220/32; F05D 2260/202
USPC ....................................................... 416/97 R
See application file for complete search history.

(56) References Cited

U.S. PATENT DOCUMENTS

| 6,974,308 B2 | 12/2005 | Halfmann et al. |
| 8,955,576 B2 | 2/2015 | Albert et al. |

(Continued)

FOREIGN PATENT DOCUMENTS

| EP | 2565383 | 3/2013 |
| EP | 2653655 | 10/2013 |
| WO | 2014105108 | 7/2014 |

OTHER PUBLICATIONS

European Search Report for EP Application No. 18173439.3 dated Sep. 28, 2018.

*Primary Examiner* — J. Todd Newton
(74) *Attorney, Agent, or Firm* — Carlson, Gaskey & Olds, P.C.

(57) ABSTRACT

A component for a gas turbine engine includes a wall that has an exterior surface and an interior surface spaced from the exterior surface. A cooling circuit extends from the interior surface to the exterior surface. The cooling circuit includes a feed passage that has a first end defining an inlet at the interior surface and a second end spaced from the first end. At least one second passage is in fluid communication with the feed passage. At least one slot passage is in fluid communication with the second end of the feed passage and a cooling slot in the exterior surface.

21 Claims, 6 Drawing Sheets

(56) References Cited

U.S. PATENT DOCUMENTS

| | | | |
|---|---|---|---|
| 2004/0076519 A1* | 4/2004 | Halfmann | B22C 9/04 |
| | | | 416/97 R |
| 2012/0070306 A1* | 3/2012 | Lee | F01D 5/187 |
| | | | 416/97 R |
| 2013/0052037 A1* | 2/2013 | Abdel-Messeh | F01D 5/186 |
| | | | 416/97 R |
| 2013/0272850 A1* | 10/2013 | Bunker | F01D 5/147 |
| | | | 415/116 |
| 2015/0345396 A1* | 12/2015 | Zelesky | F01D 5/187 |
| | | | 60/806 |
| 2016/0003056 A1 | 1/2016 | Xu | |
| 2016/0032732 A1 | 2/2016 | Propheter-Hinckley et al. | |
| 2016/0362985 A1* | 12/2016 | Lacy | F01D 5/187 |
| 2016/0376989 A1 | 12/2016 | Quach et al. | |

\* cited by examiner

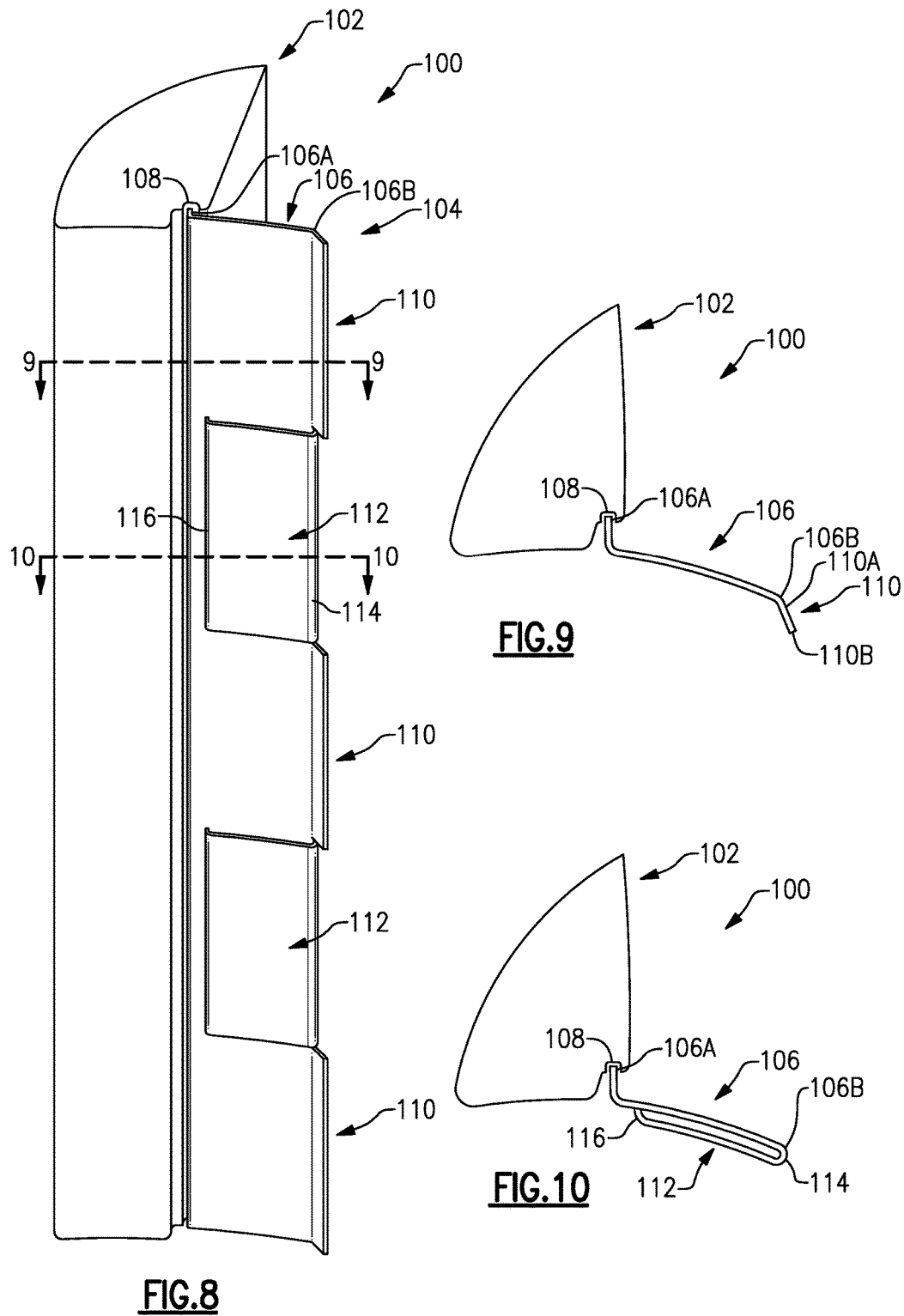

COMPONENT FOR A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Turbine engine components, such as turbine blades and vanes, are operated in high temperature environments. To avoid deterioration in the components resulting from their exposure to high temperatures, it is necessary to provide cooling circuits within the components. Turbine blades and vanes are subjected to high thermal loads on both the suction and pressure sides of their airfoil portions and at both the leading and trailing edges. The regions of the airfoils having the highest thermal load can differ depending on engine design and specific operating conditions. Similarly, combustor liners are subjected to high temperatures that can lead to deterioration.

SUMMARY

In one exemplary embodiment, a component for a gas turbine engine includes a wall that has an exterior surface and an interior surface spaced from the exterior surface. A cooling circuit extends from the interior surface to the exterior surface. The cooling circuit includes a feed passage that has a first end defining an inlet at the interior surface and a second end spaced from the first end. At least one second passage is in fluid communication with the feed passage. At least one slot passage is in fluid communication with the second end of the feed passage and a cooling slot in the exterior surface.

In a further embodiment of any of the above, the second end of the feed passage is fluidly connected to a first end of the at least one second passage.

In a further embodiment of any of the above, a second end of the at least one second passage is fluidly connected to a mid-portion of the feed passage.

In a further embodiment of any of the above, at least one second passage includes a plurality of second passages. At least one slot passage includes a plurality of slot passages. The plurality of second passages are in an alternating arrangement with the plurality of slot passages along the second end of the feed passage.

In a further embodiment of any of the above, at least one second passage is at least one exterior passage located between the feed passage and the exterior surface.

In a further embodiment of any of the above, at least one second passage is at least one interior passage located on an opposite side of the feed passage from the exterior surface.

In a further embodiment of any of the above, at least one second passage includes at least one interior passage and at least one exterior passage both spaced from the feed passage and the at least one interior passage. At least one exterior passage and the feed passage define wall segments there between.

In a further embodiment of any of the above, a first end of each of at least one interior passage is attached to the second end of the feed passage. A second end of each of at least one interior passage is attached to a mid-portion of feed passage. A first end of each of at least one exterior passage is attached to the second end of the feed passage. A second end of each of at least one exterior passage is attached to the mid-portion of the feed passage.

In a further embodiment of any of the above, at least one exterior passage, at least one exterior passage, and at least one slot passage are positioned in an alternating arrangement along the second end of the feed passage.

In a further embodiment of any of the above, at least one exterior passage is fluidly connected to the feed passage by a first plurality of connecting passages.

In a further embodiment of any of the above, at least one exterior passage is fluidly connected to the feed passage by a second plurality of connecting passages.

In a further embodiment of any of the above, the first plurality of connecting passages and the second plurality of connecting passages are each spaced inward from opposing ends of the feed passage.

In a further embodiment of any of the above, the component is an airfoil and the feed passage extends in an axial direction.

In a further embodiment of any of the above, the cooling circuit is located adjacent a pressure side of the airfoil.

In a further embodiment of any of the above, the cooling circuit is located adjacent a suction side of the airfoil.

In another exemplary embodiment, a method of forming a core assembly includes the steps of forming a trough in a core and attaching a refractory metal core to the trough. The refractory metal core includes a feed portion that has a first end attached to the core and a second end spaced from the core. At least one slot portion extends from the second end of the feed portion. At least one second portion is spaced from the feed portion and is configured to define a multi-walled segment in the core assembly.

In a further embodiment of any of the above, a first end of each of at least one second portion is attached to the second end of the feed portion. A second end of each of at least one second portion is attached to a mid-region of the feed portion.

In a further embodiment of any of the above, at least one second portion includes at least one exterior portion and at least one interior portion. At least one slot portion, at least one exterior portion and at least one interior portion are attached to the second end of the feed portion in an alternating arrangement.

In a further embodiment of any of the above, at least one second portion is attached to the feed portion by a plurality of stand offs.

In a further embodiment of any of the above, at least one second portion includes at least one interior portion and at least one exterior portion. At least one interior portion and the at least one exterior portion are located on opposite sides of the feed portion.

BRIEF DESCRIPTION OF THE DRAWINGS

FIG. 8 illustrates an example core assembly.

FIG. 9 illustrates a cross-sectional view taken along line 9-9 of the core assembly of FIG. 8.

FIG. 10 illustrates a cross-sectional view taken along line 10-10 of the core assembly of FIG. 8.

DETAILED DESCRIPTION

Figure 1:
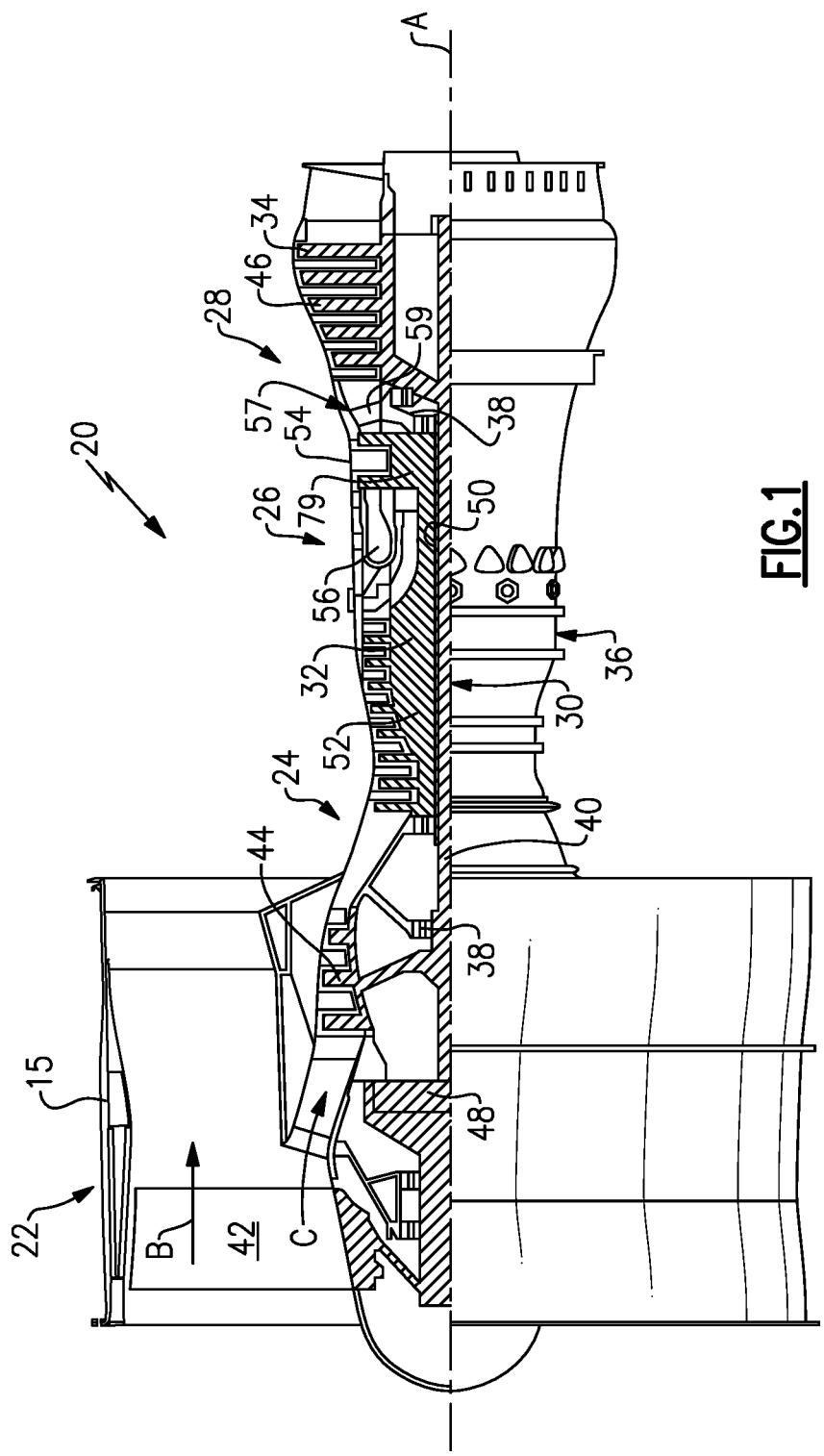
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
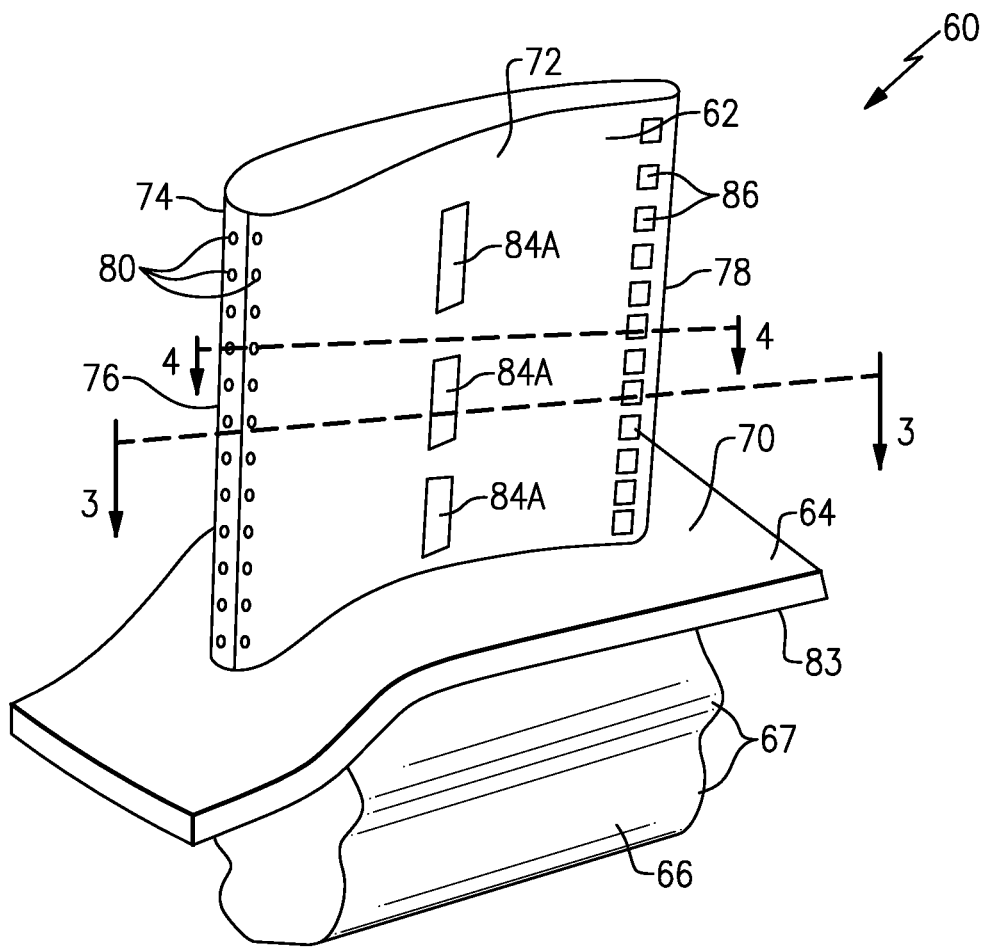
FIG. 2 shows an example gas turbine engine component.

FIG. 2 illustrates an example gas turbine engine component 60. In the illustrated example, the component 60 includes an airfoil 62, a platform 64, and optionally a root portion 66. In the illustrated example, the component 60 is a turbine blade. However, the component 60 could also be a vane, vane doublet, a compressor blade, a combustor liner, a blade outer air seal, or any structure that with cooling features formed from ceramic cores or cores of other material. The component 60 is configured to form a circumferential ring surrounding the engine axis A when jointed with additional similar components 60. In this disclosure, circumferential or circumferentially spaced is relative to a circumference surrounding the engine axis A of the gas turbine engine 20 unless otherwise specified.

The radially outer side 70 of the platform 64 forms a radially inner boundary for fluid traveling over the component 60. The root portion 66 extends radially inward from the platform 64 to retain the component 60 to a turbine rotor 79 (FIG. 1). The root portion 66 is located on an opposite side of the platform 64 from the airfoil 62 on a radially inner side 83. The root portion 66 includes teeth 67 located on opposite sides of the root portion 66 for engaging complimentary shaped receptacles on the turbine rotor 79 of the gas turbine engine 20.

As shown in FIG. 2, the airfoil 62 includes a pressure side 72 forming an exterior wall and a suction side 74 forming another exterior wall opposite the pressure side 72. Leading edge cooling holes 80 are spaced radially along a leading edge 76 of the airfoil 62 on both the pressure side 72 and the suction side 74. Although the leading edge cooling holes 80 in the illustrated example are circular, other shapes such as elliptical holes, oval holes, oblong holes, and race-track shaped holes could be used.

A first plurality of cooling slots 84A are spaced radially along the pressure side 72 of the airfoil 62. In the illustrated example, the first plurality cooling slots 84 are axially aligned and extend in a radial or spanwise direction (e.g., radially through a central portion of the component 60). Trailing edge cooling holes 86 are spaced radially along the pressure side 72 of the airfoil 62 immediately upstream of a trailing edge 78.

Figure 3:
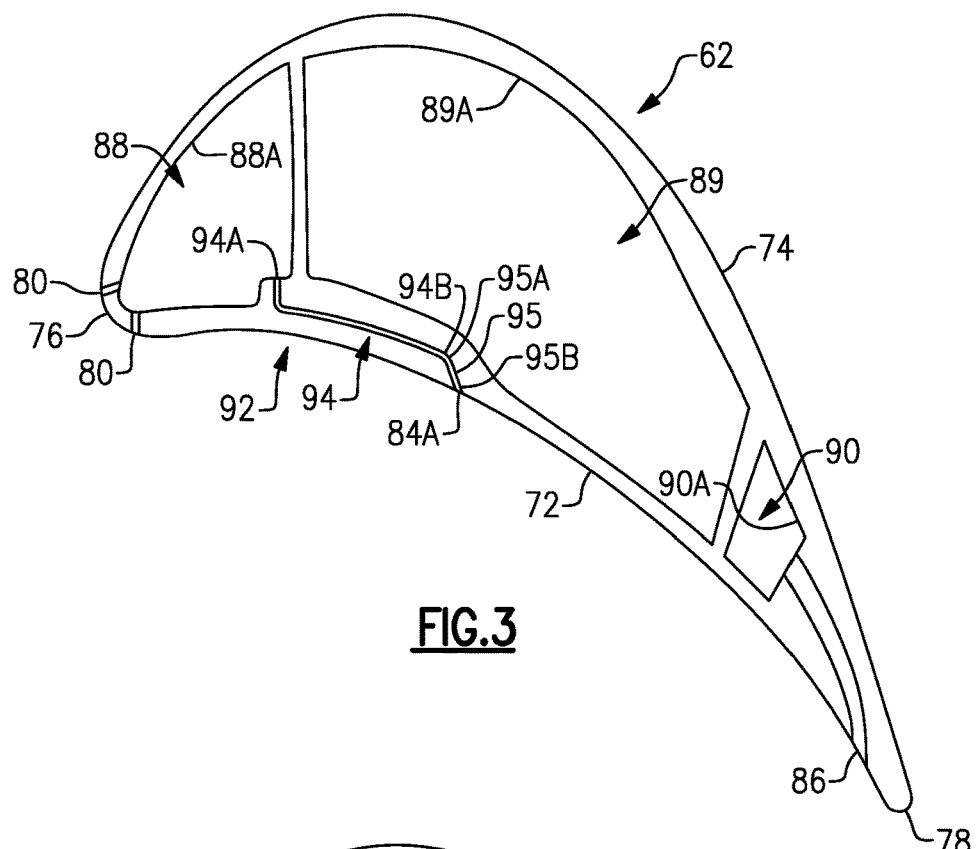
FIG. 3 is a cross-sectional view taken along line 3-3 of the gas turbine component of FIG. 2.
Figure 4:
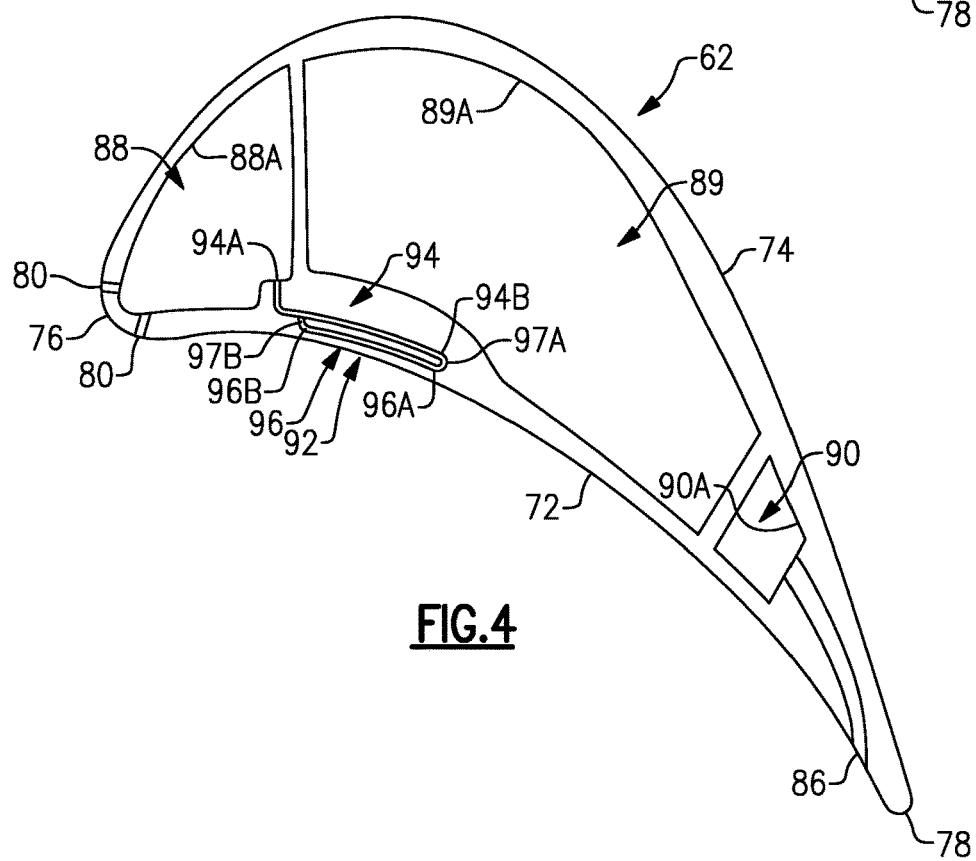
FIG. 4 is a cross-sectional view taken along line 4-4 of the gas turbine component of FIG. 2.

As shown in FIGS. 3 and 4, the airfoil 62 includes internal cooling cavities that extend in a spanwise or radial direction, such as a leading edge cavity 88 having an interior surface 88A, an intermediate cavity 89 having an interior surface 89A, and a trailing edge cavity 90 having an interior surface 90A. In the illustrated non-limiting embodiment, the leading edge cavity 88 feeds cooling air to the first plurality of cooling slots 84A to facilitate film cooling over the pressure side 72. The leading edge cavity 88, the intermediate cavity 89, and the trailing edge cavity 90 are formed through an investment casting process using cores, such as ceramic cores.

In the illustrated non-limiting embodiment, a cooling circuit 92 fluidly connects the leading edge cavity 88 with the first plurality of cooling slots 84A. The cooling circuit 92 shields the intermediate cavity 89 from heat on the pressure side 72 and provides film cooling along the pressure side 72. The cooling circuit 92 includes a feed passage 94 that extends in a radial or spanwise direction along the airfoil 62 between radially opposing ends of the cooling circuit 92. The feed passage 94 includes a forward end 94A, an aft end 94B, and a mid-portion located between the forward end 94A and the aft end 94B. The forward end 94A is fluid communication with the leading edge cavity 88 such that the forward end 94A forms an inlet into the cooling circuit 92.

As shown in FIG. 3, the aft end 94B of the feed passage 94 is in fluid communication with a forward end 95A of a slot passage 95. An aft end 95B of the slot passage 95 defines one of the first plurality of cooling slots 84A in the pressure side 72 of the airfoil 62. The slot passage 95 is transverse to the pressure side 72 with a directional component of the slot passage 95 pointing in a downstream or aft direction to facilitate film cooling along the pressure side 72.

FIG. 4 illustrates that an exterior passage 96 is also fluidly connected to the feed passage 94. The exterior passage 96 and the feed passage 94 are at least partially axially aligned or overlapping with each other. The exterior passage 96 is attached to the aft end 94B of the feed passage 94 but at a different radial position along the aft end 94B from the slot passage 95. In the illustrated non-limiting embodiment, the aft end 94B of the feed passage 94 is fluidly connected to an aft end 96A of the exterior passage 96 by an aft return passage 97A. The aft return passage 97A includes a U-shaped profile such that the aft return passage 97A directs the cooling air traveling through the feed passage 94 from a generally downstream or aft direction to a generally upstream or forward direction through the exterior passage 96. Therefore, the direction of cooling air flow through the feed passage 94 is generally opposite of the direction of cooling air flow through the exterior passage 96.

A forward end 96B of the exterior passage 96 is fluidly connected to the mid-portion of the feed passage 94 through a forward return passage 97B. The forward return passage 97B has an elbow or U-shaped profile to direct the cooling air flow from the exterior passage 96 back into the feed passage 94.

In the illustrated non-limiting embodiment, the cooling circuit 92 includes three slot passages 95 spaced from each other by one of the exterior passages 96 such that the slot passages 95 are arranged in an alternating pattern with the exterior passages 96. Alternatively, the cooling circuit 92 could include more than three slot passages 95 or less than 3 slot passages 95 with one of the exterior passages between each of the slot passages 95.

Figure 5:
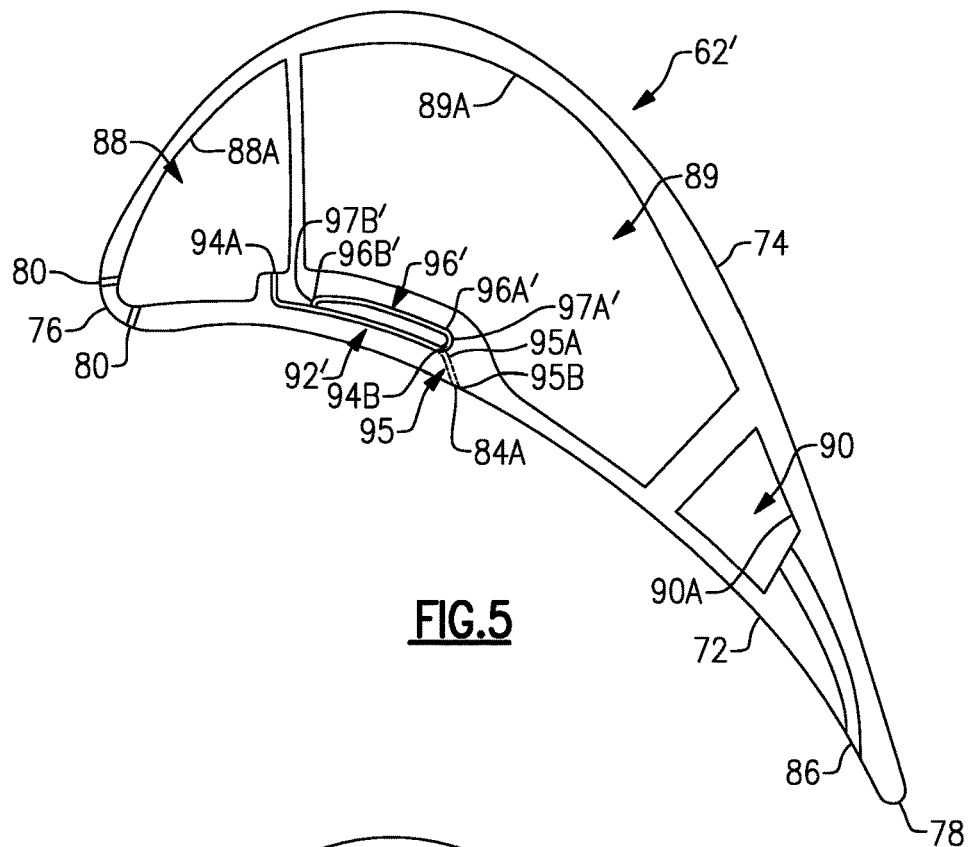
FIG. 5 is a cross-sectional view of another example gas turbine engine component.

FIG. 5 illustrates a cross-sectional view of an airfoil 62' having a cooling circuit 92'. The airfoil 62' is similar to the airfoil 62 except where shown in the Figures or described below. The cooling circuit 92' in the airfoil 62' includes the feed passage 94, the slot passage 95 (shown in hidden lines), and an interior passage 96'. The interior passage 96' and the feed passage 94 are at least partially axially aligned or overlapping with each other. The slot passage 95 and the interior passage 96' are in an alternating arrangement extending in a radial or spanwise direction along the aft end 94B of the feed passage 94. In the illustrated non-limiting embodiment, the cooling circuit 92' includes three slot passages 95 spaced from each other by one of the interior passages 96' such that the slot passages 95 are arranged in an alternating pattern with the interior passages 96'.

The interior passage 96' is fluidly connected to the feed passage 94 and located on an opposite side of the feed passage 94 from the pressure side 72 of the airfoil 62'. In the illustrated non-limiting embodiment, the aft end 94B of the feed passage 94 is connected to an aft end 96A' of the interior passage 96' with an aft interior return passage 97A'. In the illustrated embodiment, the aft interior return passage 97A' includes a U-shaped profile such that the aft interior return passage 97A' redirects the cooling air traveling through the feed passage 94 in a generally downstream or aft direction to a generally upstream or forward direction through the interior passage 96'. A second end 96B' of the interior passage 96' is fluidly connected to the mid-portion of the feed passage 94 through a forward interior return portion 97B'.

Figure 6:
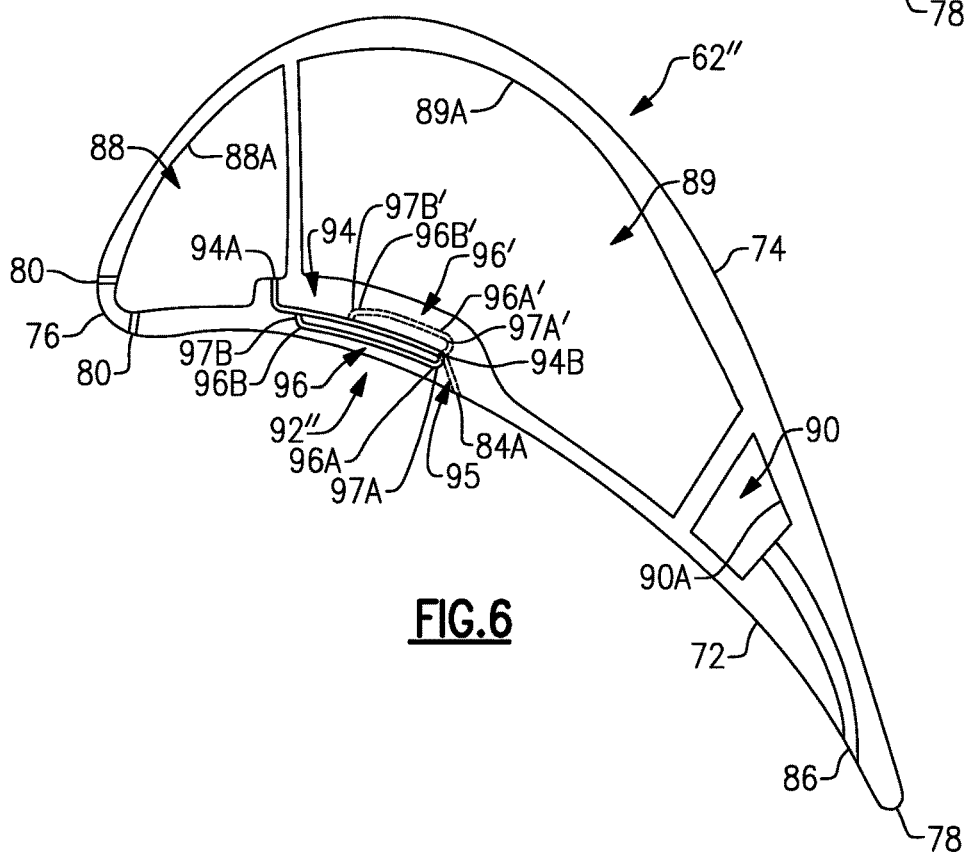
FIG. 6 is another cross-section view of yet another gas turbine engine component.

FIG. 6 illustrates yet another embodiment of an airfoil 62". The airfoil 62" is similar to the airfoils 62 and 62' except where shown in the Figures or described below. The airfoil 62" includes a cooling circuit 92" having the feed passage 94, the exterior passage 96, and the interior passage 96'. In the illustrated non-limiting embodiment, the slot passages 95 are arranged in an alternating pattern along the aft end 94B of the feed passage 94. At least one of the exterior passage 96 and the interior passage 96' are located between adjacent slot passages 95. The forward interior return passage 97B' is staggered along the mid-portion of the feed passage 94 from the forward return passage 97B to improve flow through the feed passage 94.

Although the passages 94, 95, 96, and 96' described above are fed by the leading edge cavity 88 and located adjacent the pressure side 72, the passages 94, 95, 96, and 96' could be fed by the intermediate cavity 89 or the trailing edge cavity 90 and/or located adjacent the suction side 74 in place of being located adjacent the pressure side 72 or in addition to being located adjacent the pressure side 72. Additionally, the passages 94, 95, 96, and 96' could shield the leading edge cavity 88 or the trailing edge cavity 90.

Figure 7:
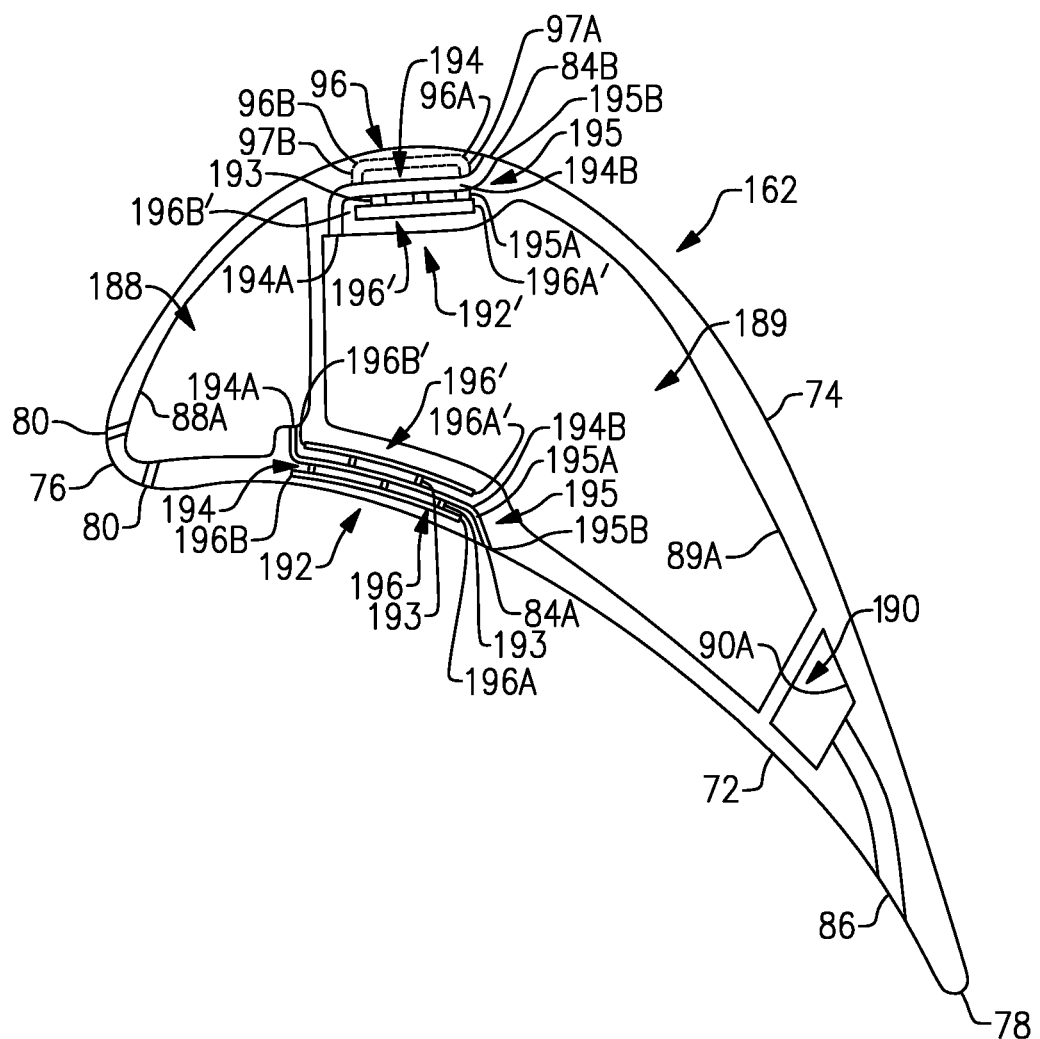
FIG. 7 is a cross-sectional view of a further example gas turbine engine component.

FIG. 7 illustrates a further non-limiting embodiment of an airfoil 162. The airfoil 162 is similar to the airfoils 62, 62', 62" except where shown in the Figures or described below. The reference numerals from the airfoil 62 will to be used to identify similar component in the airfoil 162. The airfoil 162 includes a first cooling circuit 192 located adjacent the pressure side 72 and a second cooling circuit 192' located adjacent the suction side 74 of the airfoil 162. In the illustrated non-limiting embodiment, the first cooling circuit 192 is fed off of leading edge cavity 188, but the first cooling circuit 192 could be fed off of intermediate cavity 189 or the trailing edge cavity 190. Additionally, the first cooling circuit 192 could be located adjacent the suction side 74 of the airfoil 162 and the second cooling circuit 192' could be located adjacent the pressure side 72 of the airfoil 162.

The first cooling circuit 192 includes a feed passage 194, a slot passage 195, an exterior passage 196, and an interior passage 196'. The feed passage 194 extends in a radial direction along the airfoil 162 between opposing radial ends of the first cooling circuit 192. The feed passage 194 includes a forward end 194A and an aft end 194B and a mid-portion located between the forward end 194A and the aft end 194B. The forward end 194A is in fluid communication with the leading edge cavity 88 such that the forward end 194A forms an inlet into the first cooling circuit 192.

The aft end 194B of the feed passage 194 is in fluid communication with a forward end 195A of the slot passage 195. An aft end 195B of the slot passage 195 defines one of the first plurality of cooling slots 84A. The slot passage 195 is transverse to the pressure side 72 with a directional component of the slot passage 195 pointing in a downstream or aft direction to facilitate film cooling along the pressure side 72.

The exterior passage 196 is located between the pressure side 72 and the feed passage 194 and the interior passage 196' is located on an opposite side of the feed passage 194 from the exterior passage 196. The feed passage 194 is fluidly connected to the exterior passage 196 and the interior passage 196' through a plurality of connecting passages 193. In the illustrated non-limiting embodiment, the connecting passages 193 include a circular cross section and are generally perpendicular to the feed passage 194, the exterior passage 196, and the interior passage 196'. However, the connecting passages 193 could be non-circular and/or non-perpendicular relative any one of the feed passage 194, the exterior passage 196, and the interior passage 196'. The connecting passages 193 are spaced from opposing ends 196A, 196B of the exterior passage 196 and opposing ends 196A', 196B' of the interior passage 196'

The airfoil 162 also includes the second cooling circuit 192' illustrating the interchangeability of the features of the cooling circuits 92, 92' with features of the first cooling circuit 192. The second cooling circuit 192' includes the feed passage 194 with the forward end 194A in fluid communication with the intermediate cavity 89 and the aft end 194B in communication with the slot passage 195 and one of a second plurality of cooling slots 84B.

The aft end 194B of the feed passage 194 is also fluidly connected to the exterior passage 96 (shown in dashed lines) with the aft return passage 97A at the aft end 96A of the exterior passage 96. The forward end 96B of the exterior passage 96 is fluidly connected to a mid-portion of the feed passage 194 through the forward return passage 97B. The interior passage 196' is located on an opposite side of the feed passage 194 from the exterior passage 96 and is connected to the feed passage 194 by the connecting passages 193.

FIG. 8 illustrates a core assembly 100. The component 60 can be formed from the core assembly 100 or through an additive manufacturing process. In the illustrated non-limiting embodiment, the core assembly 100 includes a leading edge core 102 and a refractory metal core (RMC) 104. The leading edge core 102 corresponds to the leading edge cavity 88 and the refractory metal core corresponds to the cooling circuit 92 in the airfoil 62. The core assembly 100 could also include additional cores corresponding to the intermediate cavity 89 and a core corresponding to the trailing edge cavity 90.

In the illustrated non-limiting embodiment, the RMC 104 includes a feed portion 106 that corresponds to the feed passage 94. The feed portion 106 extends between opposite longitudinal ends of the RMC 104 and the core assembly 100. A first end 106A of the feed portion 106 is configured to be accepted into a trough 108 of the leading edge core 102 as shown in FIGS. 8-10. In one non-limiting embodiment, the first end 106A of the feed portion 106 is fixed within the trough 108 with an adhesive in preparation for forming a core assembly and casting the component 60.

The feed portion 106 is attached to a slot portion 110 (FIGS. 8 and 9) and an exterior portion 112 (FIGS. 8 and 10) in an alternating arrangement. A first end 110A of the slot portion 110 is attached to the second end 106B of the feed portion 106 and a second end 110B of the slot portion 110 corresponds to one of the slot passages 95.

The second end 106B of the feed portion 106 is also attached to the exterior portion 112 by an aft return portion 114 and the exterior portion 112 is attached to a mid-region of the feed portion 106 by a forward return portion 116. The interior passage 96' would be formed in a similar fashion but on an opposite side of the feed portion 106. Similarly, the exterior passage 196 and interior passages 196' would be formed with the use of stand offs (not shown) instead of the forward return portion 116 and the aft return portion 114.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A component for a gas turbine engine comprising:
   a wall having an exterior surface and an interior surface spaced from the exterior surface; and
   a cooling circuit extending from the interior surface to the exterior surface, the cooling circuit includes:
      a feed passage having a first end defining an inlet at the interior surface and a second end spaced from the first end;
      at least one second passage including a first end located at the second end of the feed passage and in fluid communication with the feed passage; and
      at least one slot passage including a first end located at the second end of the feed passage and in fluid communication with both the second end of the feed passage and a cooling slot in the exterior surface.

2. The component of claim 1, wherein a second end of the at least one second passage is located at a mid-portion of the feed passage and in fluid communication with the feed passage.

3. The component of claim 2, wherein the at least one second passage includes a plurality of second passages, the at least one slot passage includes a plurality of slot passages, and the plurality of second passages are in an alternating arrangement in a radial direction with the plurality of slot passages along the second end of the feed passage.

4. The component of claim 1, wherein the at least one second passage is at least one exterior passage located between the feed passage and the exterior surface and the at least one exterior passage and the feed passage define a wall segment there between.

5. The component of claim 1, wherein the at least one second passage is at least one interior passage located on an opposite side of the feed passage from the exterior surface and the at least one interior passage and the feed passage define a wall segment there between.

6. The component of claim 1, wherein the component is an airfoil and the feed passage extends in an axial direction and feed passage includes a radial width at least equal to a radial width of both the at least one second passage and the at least one slot passage.

7. The component of claim 6, wherein the cooling circuit is located adjacent a pressure side of the airfoil.

8. The component of claim 6, wherein the cooling circuit is located adjacent a suction side of the airfoil.

9. A component for a gas turbine engine comprising:
   a wall having an exterior surface and an interior surface spaced from the exterior surface; and
   a cooling circuit extending from the interior surface to the exterior surface, the cooling circuit includes:
      a feed passage having a first end defining an inlet at the interior surface and a second end spaced from the first end;
      at least one second passage in fluid communication with the feed passage; and
      at least one slot passage in fluid communication with both the second end of the feed passage and a cooling slot in the exterior surface, wherein the at least one second passage includes at least one interior passage and at least one exterior passage both spaced from the feed passage and the at least one interior passage, the at least one exterior passage, and the feed passage define wall segments there between.

10. The component of claim 9, wherein a first end of each of the at least one interior passage is attached to the second end of the feed passage, a second end of each of the at least one interior passage is attached to a mid-portion of feed passage, a first end of each of the at least one exterior passage is attached to the second end of the feed passage, and a second end of each of the at least one exterior passage is attached to the mid-portion of the feed passage.

11. The component of claim 10, wherein the at least one exterior passage, the at least one exterior passage, and the at least one slot passage are positioned in an alternating arrangement along the second end of the feed passage.

12. The component of claim 9, wherein the at least one exterior passage is fluidly connected to the feed passage by a first plurality of connecting passages.

13. The component of claim 12, wherein the at least one exterior passage is fluidly connected to the feed passage by a second plurality of connecting passages.

14. The component of claim 13, wherein the first plurality of connecting passages and the second plurality of connecting passages are each spaced inward from opposing ends of the feed passage.

15. The component of claim 9, wherein the at least one second passage is located in the wall between the feed passage and one of the interior surface or the exterior surface and the at least one second passage and the feed passage define a wall segment there between.

16. The component of claim 9, wherein the component is an airfoil and the feed passage extends in an axial direction and feed passage includes a radial width at least equal to a radial width of both the at least one second passage and the at least one slot passage.

17. A method of forming a core assembly, the method comprising the steps of:
   forming a trough in a core; and
   attaching a refractory metal core to the trough, the refractory metal core comprising:
      a feed portion having a first end attached to the core and a second end spaced from the core;
      at least one slot portion extending from the second end of the feed portion; and
      at least one second portion spaced from the feed portion configured to define a multi-walled segment in the core assembly.

18. The method of claim 17, wherein a first end of each of the at least one second portion is attached to the second end of the feed portion and a second end of each of the at least one second portion is attached to a mid-region of the feed portion.

19. The method of claim 18, wherein the at least one second portion includes at least one exterior portion and at least one interior portion, and the at least one slot portion, the at least one exterior portion, and the at least one interior portion are attached to the second end of the feed portion in an alternating arrangement.

20. The method of claim 17, wherein the at least one second portion is attached to the feed portion by a plurality of stand offs.

21. The method of claim 20, wherein the at least one second portion includes at least one interior portion and at least one exterior portion, the at least one interior portion and the at least one exterior portion are located on opposite sides of the feed portion.

* * * * *